United States Patent [19]

Shia et al.

[11] Patent Number: 4,791,038

[45] Date of Patent: Dec. 13, 1988

[54] INHIBITING VOLTAGE SUPPRESSION IN LITHIUM/FLUORINATED CARBON BATTERIES

[75] Inventors: George A. Shia, North Tonawanda; David Nalewajek; Michael F. Pyszczek, both of West Seneca, all of N.Y.

[73] Assignee: Allied-Signal Inc., Morris Township, Morris County, N.J.

[21] Appl. No.: 917,455

[22] Filed: Oct. 9, 1986

[51] Int. Cl.$^4$ ............................................. H01M 4/58
[52] U.S. Cl. ................................. 429/218; 429/212; 423/489
[58] Field of Search ................ 429/218, 212; 423/439, 423/489

[56] References Cited

FOREIGN PATENT DOCUMENTS

| | | |
|---|---|---|
| 2327308 | 6/1979 | France . |
| 067921 | 6/1976 | Japan . |
| 026457 | 2/1983 | Japan . |
| 087762 | 5/1984 | Japan . |
| 086155 | 5/1984 | Japan . |

OTHER PUBLICATIONS

Zieger, et al., Dimer Formation During Reaction of Benzylic Halides with Lithium Naphthalene and Mechanisms of Dimer Formation from Reactions of Benzylic Halides with Benzylic Carbanions, J. Amer, Chem. Soc. 98(9), 2580-5, Apr. 1976.

Whittingham, Mechanism of Reaction of the Fluorographite Cathode, J. Electrochem Soc. 122 (4), 526-7, Apr. 1975.

Meites "Polarographic Techniques" 2nd Edition, pp. 323-329, John Wiley & Sons, New York, N.Y.

Primary Examiner—John F. Niebling
Assistant Examiner—Steven P. Marquis
Attorney, Agent, or Firm—Jay P. Friedenson

[57] ABSTRACT

Voltage suppression is an important problem in the Li/CF$_x$ battery system. The voltage that a Li/CF$_x$ battery will deliver just after the circuit has been closed can be as low as the voltage near the end of battery life. Electronic circuitry powered by Li/CF$_x$ batteries are complicated by the need to design around this problem.

The processing of fluorinated carbon (CF$_x$) to lower the initial voltage suppression is disclosed wherein fluorinated carbon is treated with a Group IA metal-alkyl or -aryl compound. The reaction between these compounds (e.g., n-butyl lithium) and the fluorinated carbon produces a battery grade product which undergoes reduced to almost no suppression of the initial closed circuit voltage.

12 Claims, 1 Drawing Sheet

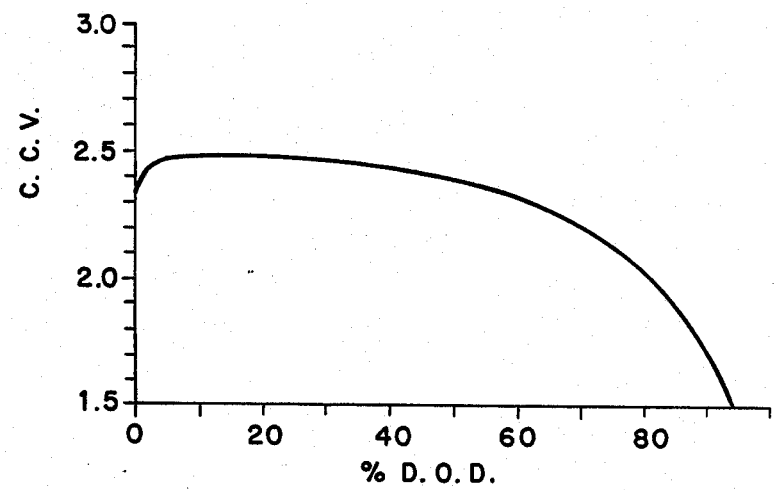
FIG. 1 (Comparative)
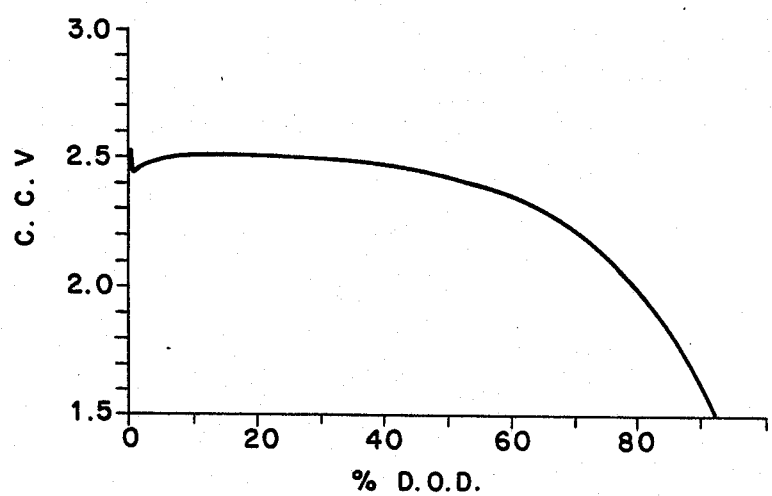
FIG. 2

INHIBITING VOLTAGE SUPPRESSION IN LITHIUM/FLUORINATED CARBON BATTERIES

DESCRIPTION

This invention relates to an improved lithium/-fluorinated carbon (Li/CF$_x$) battery and to improved forms of fluorinated carbon which are useful in making such batteries. More particularly, this invention relates to a method for reducing or substantially eliminating the suppression of the closed circuit voltage of a Li/-fluorinated carbon battery during the initial part of its discharge by the chemical treatment of the fluorinated carbon with a Group IA metal-alkyl or metal-aryl compound to reduce the fluorine groups at the surface of the fluorinated carbon with the result that there is reduced or no appreciable voltage suppression while at the same time retaining good battery capacity.

BACKGROUND OF THE INVENTION

Numerous disclosures have been made in the prior art with the aim of improving the initial discharge voltage of the lithium/fluorinated carbon batteries. Illustrative of such prior art efforts to eliminate or reduce initial voltage suppression are the disclosures in the following references.

The Japanese reference, Kokali No. 76 67,921, discloses the chemical treatment of CF$_x$ with triethylamine and ammonia to increase the discharge voltage of the battery. After treatment with the amine, the material must be washed with hydrochloric acid to remove the ammonia and the residual amine, washed with water to remove the acid, and then dried in a vacuum to remove the water. While this multi-step process reportedly reduces the effects of voltage suppression, the number of steps required in the process and the chance that residual acid or water might be carried into the cell in the treated material (lithium cells are very sensitive to acids and moisture) make this approach less than desirable.

Ultraviolet light has been disclosed in Japanese reference, Kokai No. 83 26,457, as a means to partially defluorinate CF$_x$ and to reduce the suppression of the initial discharge voltage and to improve storage. In this disclosure, the CF$_x$ is soaked or "swelled" in an organic solvent and the slurry is exposed to UV radiation. This process is very time consuming as UV radiation is capable of only very slow defluorination of CF$_x$. The effect of the residual decomposition products in the CF$_x$ sample is not reported. Another Japanese reference the follows along this same line is Kokai No. 84 86,155. In this disclosure, UV radiation is used to defluorinate CF$_x$ suspended in a solution of sodium hydroxide and methanol. Subsequent washing with water and drying are required to remove traces of the sodium hydroxide and methanol. This process is also very slow.

Another Japanese reference, Japanese No. 84 87,762, discloses the use of an aqueous solution of HI containing methanol to partially defluorinate CF$_x$. The CF$_x$, with a fluorine content of $\geq 61.3\%$ (F:C$\geq 1$) is partly defluorinated to give a material with a fluorine content of $\geq 59\%$ (F:C$\geq 0.9$). Subsequent washing with water to remove HF, formed by the reaction of HI with CF$_x$, is critical. HF can be very deleterious in a lithium battery.

Irradiation with gamma rays has also been used to defluorinate CF$_x$ and improve its discharge voltage and has been disclosed in Japanese reference Kokai No. 83 05,966. This process requires a nuclear source and would not be convenient or particularly easy to carry out in a commercial setting.

An easy, rapid, and safe chemical process to eliminate voltage suppression in the Li/CF$_x$ battery system is clearly lacking. Present practice, as covered in another Japanese reference Kokai No. 82 124,865, is to partially discharge the Li/CF$_x$ cell until 10% of its capacity is expended. This procedure is claimed to reduce the effects of voltage suppression, but requires additional equipment and processing time.

Accordingly, while it is known that various chemical treatments of fluorinated carbon have been employed to improve the initial discharge voltage in Li/CF$_x$ cells, a need exists for a simple, rapid, and safe chemical treatment to effectively eliminate voltage suppression.

SUMMARY OF THE INVENTION

In accordance with the invention, voltage suppression is reduced or substantially minimized in lithium fluorinated carbon batteries by the chemical treatment of the fluorinated carbon with Group IA metal-alkyl compounds or Group IA metal-aryl compounds, which Group IA metal-aryl compounds have at least 10 carbon atoms. The reaction between these reagents (e.g., n-butyl lithium) and the fluorinated carbon reduces the fluorine groups on the surface of the material and produces a material suitable for use in a battery which undergoes reduced or almost no suppression of the initial closed circuit voltage.

BRIEF DESCRIPTION OF THE DRAWING

FIG. 1 shows the closed circuit voltage (CCV) as a function of the depth of discharge (DOD) for a cell made with the untreated material. The voltage suppression (CCV$_s$) for this cell is 150 mV.

FIG. 2 shows the closed circuit voltage as a function of depth of discharge for a cell made with a material that had been treated in accordance with this invention, viz. 4 cc of n-butyl lithium. The voltage suppression (CCV$_s$) for this cell is 30 mV.

DETAILED DESCRIPTION OF THE INVENTION

In accordance with the invention, voltage suppression is reduced or greatly minimized in lithium fluorinated carbon batteries by the chemical treatment of the fluorinated carbon with a Group IA metal-alkyl compound or a Group IA metal-aryl compound which Group IA metal-aryl compound has at least 10 carbon atoms. The reaction between such materials and the fluorinated carbon reduces the fluorine on the surface of the material and produces a material suitable for use in a battery which undergoes reduced or almost no suppression of the initial closed circuit voltage depending upon the extent of the reaction and the corresponding reduction of the surface fluorine. The grade of CF$_x$ is not critical to pratice of this invention. Any grade of CF$_x$ which is used to make a Li/CF$_x$ battery is suitable for use in accordance with the invention.

The Group IA metals in the Group IA metal alkyl or aryl compounds include lithium (Li), sodium (Na), potassium (K), rubidium (Rb), cesium (Cs) and francium (Fr). Lithium is preferred since in this case the product formed by chemical treatment in accordance with the invention is LiF, the same product formed when a Li/CF$_x$ battery is discharged. The other Group IA fluorides are, however, not harmful to the battery.

By alkyl is intended to mean any aliphatic saturated hydrocarbon group including straight-chain, branched chain or cyclic hydrocarbon groups. We know of no technical limitation on the carbon content of the aliphatic saturated hydrocarbon group. For reasons of economics and availability, the preferred carbon content of such groups is from 1–4. Illustrative suitable alkyl groups include methyl, isopropyl, n-butyl, neopentyl, n-dodecyl and cyclohexyl.

By aryl is intended to mean any aromatic hydrocarbon group which may include aliphatic, saturated, hydrocarbon group side-chains. We know of no technical limitation on the carbon content or number of rings in the aryl group, except that the aryl groups must have at least 10 carbon atoms. Illustrative suitable aryl groups include those derived from naphthalene, anthracene, phenanthrene, pyrene and chrysene. Naphthyl is the preferred aryl group.

Illustrative suitable Group IA metal-alkyl and Group IA metal-aryl compounds are methyl lithium, ethyl lithium, n-butyl lithium, n-propyl sodium, sec.-butyl potassium, n-butyl rubidium, n-butyl cesium, n-hexyl francium, cyclohexyl lithium, potassium naphthalide, sodium naphthalide, lithium naphthalide and cesium anthranide. n-Butyl lithium is the preferred compound because of its ready availability and ease of handling.

The Group IA metal-alkyl and Group IA metal-aryl compounds are known classes of compounds and particular species are either commercially available or readily prepared by procedures published in the literature.

Voltage suppression is an important problem in the $Li/CF_x$ battery system. The voltage that a $Li/CF_x$ battery will deliver just after the circuit has been closed can be as low as the voltage near the end of battery life. Electronic circuitry powdered by $Li/CF_x$ batteries are complicated by the need to design around this problem. Even in simpler applications such as lighting; a bulb powered by a $Li/CF_x$ battery would appear dim during the beginning of battery life. This observation would tend to confuse inexperienced users to think that the battery is weak or defective. To compensate for this problem, the battery manufacturers have predischarged their $Li/CF_x$ cells, removing as much as 10% of the battery's capacity. This predischarge is an additional manufacturing step which tends to slow down processing and increase costs.

In contradiction to the prior art methods which suffer from being very slow chemical processes, or require that the treated materials be scrupulously cleaned of reactants and by-products because they are deleterious to the battery, or that the level of fluorine removal is difficult to control because an excess of the reagent must be used to drive the reaction, or a combination of all of these problems, the surface fluorine reduction procedure of the present invention produces no by-products which are harmful to the battery if not removed, is rapid, and the level of removal is very easy to control because the Group IA metal alkyl and aryl compounds react rapidly and quantitatively with $CF_x$.

It is believed that the surface fluorine reduction or stripping procedure of the invention results in alkyl or aryl groups from the Group IA metal-alkyl or metal-aryl compounds being substituted on the $CF_x$ for the surface fluorine atoms. This invention, however, is not to be limited to any theory of operation.

In view of the relatively small number of surface fluorine atoms replaced, characterization of the reacted $CF_x$ product is not easy and we have not attempted same. However, we believe the $CF_x$ product which is obtained by the reaction to be novel and therefore to be a part of the invention. Any amount of surface fluorine reduction of the $CF_x$ will achieve a reduction of voltage suppression in the resulting lithium $CF_x$ battery and this invention contemplates even small reductions of voltage suppression. However, if a substantial reduction of voltage suppression is desired, a substantial reduction of surface fluorine on the $CF_x$ must be achieved. By substantial we mean a reduction of at least about 5% of the total surface fluorine present. Generally, it is not desirable to reduce more than about 10% of the total surface fluorine present since this, depending on circumstances, may result in undue sacrifice of the battery capacity.

An inert solvent should be used for the reaction in which the Group IA metal compound is soluble and in which the $CF_x$ is dispersed. Suitable solvents include tetrahydrofuran, the alkanes, such a hexane, and the dialkyl ethers, such as dimethyl ether. Other suitable solvents will readily occur to those skilled in the art. The prefeerred solvents are those in which the Group IA fluoride by-products are soluble. Although not essential, this is preferred in order to facilitate removal of such by-products, if desired.

The reaction temperature should be selected so as to maximize the reaction rate, while achieving uniform results. Generally, acceptable reaction temperatures can be in the range of about $-78°$ c. to $(+)40°$ c. to $(+)20°$ c. Generally, the higher the reaction temperature; the higher the reaction rate. Higher temperatures, particularly above 40° c., may produce non-uniform results.

If a temperature is chosen which gives a good reaction rate, reaction times for completion of the reaction are generally from about 15 minutes to 1 hour. The progress of the reaction can be monitored by determining the Group IA fluoride by-product produced or by determining the amount of Group IA metal compound reacted.

One advantage of this invention is that the Group IA metal compounds react rapidly and quantitatively with the $CF_x$. Their exact concentration can be determined by standard titration methods, thus allowing the operator to add only the stoichiometrically required quantity to the reaction medium. This enables controlled and uniform degrees of stripping (or surface fluorine reduction), as desired.

The invention will be further described by the following specific examples. It should be understood, however, that although these examples may describe in detail certain preferred operating conditions of the invention, they are given primarily for purposes of illustration and the invention in its broader aspects is not limited thereto.

EXAMPLE 1

In this example, an alkyl lithium compound in accordance with the invention is used to prepare $CF_X$ with reduced surface fluorine which is, in turn, used to make a cathode for a lithium anode non-aqueous cell. The result is minimal voltage suppression. Four grams of ACCUFLUOR ® $CF_x$, grade 1000, were suspended in about 20 cc. of tetrahydrofuran (THF). This slurry was cooled to 0 degrees C., and 8 cc. of a 1.55M solution of n-butyl lithium in hexane were added drop-wise over a 15 minute period. Mixing was continued for another 15 minutes at 0 degrees C., and another 15 minutes at room temperature. The sample was then washed with acetone and dried. To test the materials for voltage suppression, cathodes were formulated by mixing the $CF_x$ sample with about 13% acetylene black and 4% PTFE and then blending and forming the material into a sheet as described in U.S. Pat. No. 4,556,618. The cathodes were then tested by incorporating them into lithium anode non-aqueous electrolyte cells and discharging the cells across 1 Kohm resistive loads. Cell voltage was monitored and cell capacity was calculated from the discharge curve. This experiment was repeated using different quantities of n-butyl lithium and the results are shown below in Table A.

TABLE A

| cc. of n-butyl lithium/ 4 grams of $CF_x$ | $CCV_s$ | cell voltage, mid-life | cell capacity, mAH/g ($CF_x$) |
|---|---|---|---|
| 8 | 20 | 2.39 | 734 |
| 4 | 30 | 2.39 | 797 |
| 4 | 20 | 2.44 | 803 |
| 2 | 20 | 2.39 | 786 |
| 0 (untreated) | 150 | 2.38 | 798 |

An 8 cc. aliquot of the n-butyl lithium solution removes about 10% of the fluorine contained in a 4 gram sample of $CF_x$ and concomitantly reduces the capacity of cells made with this treated material by about 10%. For the experiments using smaller volumes of n-butyl lithium, no loss in capacity could be discerned. These results are for cells discharged on a 1 Kohm load which equates to approximately 2.4 mA/cm2 of cathode area for the cells used in this experiment. At lower rates of discharge, some minimal ($\leq = 5\%$) loss in capacity might be evident.

All of the cells made with $CF_x$ treated with n-butyl lithium showed pratically no voltage suppression and had very flat discharge profiles.

EXAMPLE 2

In this example, it is shown that $CF_x$ treated with alkyl lithium compounds need not be washed to attain suitable battery performance. Ten grams of ACCUFLUOR ® $CF_x$, grade 1000, were suspended in hexane. This slurry was cooled to 0 degrees C., and 10 cc of a 1.55M solution of n-butyl lithium in hexane were added drop-wise over the course of about 0.5 hours. The treated $CF_x$ was then separated into two approximately equal fractions. One fraction was thoroughly washed with tetrahydrofuran (THF) to remove the LiF reaction by-product and then dried. The other fraction was just dried without washing. The two fractions were formulated into cathodes and tested as described in Example 1. As the following table (Table B) shows, washing the reaction by-products out of the treated material is not necessary.

TABLE B

| Sample | $CCV_s$ | cell voltage, mid-life | cell capacity, mAH/g ($CF_x$) |
|---|---|---|---|
| Washed | 30 | 2.39 | 743 |
| Unwashed | 20 | 2.37 | 749 |

The performance of cells made with the treated $CF_x$ were in no way affected by the reaction products of the chemical treatment which remained in the unwashed sample.

EXAMPLE 3

In this example, sodium naphthalide is used to treat a sample of $CF_x$, ACCUFLUOR ® $CF_x$, grade 1000. The sodium naphthalide solution was prepared by dissolving 12.8 grams of naphthalene in 100 cc. of tetrahydrofuran (THF). The THF was previously dried over 4 Å molecular sieves. Then 2.5 grams of clean sodium metal were added to the solution and the mixture was kept under a dry nitrogen atmosphere and stirred overnight. Sodium naphthalide was formed in situ.

Approximately 17 cc. of the above solution were syringed (over about a 5 min. period) into a sealed flask containing 10 gram of $CF_x$ in a THF slurry. The slurry was cooled to 0 degrees C. The slurry was vigorously stirred during the addition of the sodium naphthalide and for about 10 minutes after the last of the reagent was added. The flask was then opened, the solid material was filtered off and washed with some THF. The treated $CF_x$ was dried and made into cathodes and tested in the same manner as described in Example 1.

The resulting batteries made with this treated $CF_x$ had a $CCV_s$ of about 20 mV and capacities of about 750 mAH/g. The untreated $CF_x$ has a $CCV_s$ of about 150 mV.

EXAMPLES 4-14

In these examples, various Group IA metal-alkyl and aryl compounds according to the invention are used to treat samples of ACCUFLUOR ® $CF_x$ grade 1000. The treated samples are formulated into cathodes and tested in the same manner described in Example 1. The results are the same in that in all cases all of the cells tested show practically no voltage suppression and have very flat discharge profiles.

| Example | Group IA Metal Compound |
|---|---|
| 4 | methyl lithium |
| 5 | ethyl lithium |
| 6 | n-propyl lithium |
| 7 | n-propyl sodium |
| 8 | sec-butyl potassium |
| 9 | n-butyl rubidium |
| 10 | n-butyl cesium |
| 11 | n-hexyl francium |
| 12 | cyclohexyl lithium |
| 13 | lithium naphthalide |
| 14 | cesium anthranide |

It will be understood that variations in compositions and treating steps may be made within the ranges and procedures disclosed herein and, therefore, the conditions and specific mixtures disclosed for illustrative purpose should not be construed as limitations on the invention except as set forth in the claims which follow.

What is claimed is:

1. A lithium/fluorinated carbon battery having a reduced initial voltage suppression which comprises the incorporation in the battery cathode of fluorinated carbon which has been reacted with a compound selected from the group consisting of a Group IA metal-alkyl compound and a Group IA metal-aryl compound, which Group IA metal-aryl compound has at least 10 carbon atoms, until surface fluorine on the fluorinated carbon has been stripped and alkyl or aryl groups from the Group IA metal-alkyl compound or Group IA metal-aryl compound are substituted for surface fluorine atoms.

2. The battery of claim 1 in which surface fluorine on the fluorinated carbon has been substantially stripped.

3. The battery of claim 1 in which from about 5-10% of the surface fluorine on the fluorinated carbon has been stripped.

4. The battery of claim 3 wherein the Group IA metal compound is a Group IA metal-alkyl compound.

5. The battery of claim 4 wherein the Group IA metal compound contains from 1–4 carbon atoms.

6. The battery of claim 5 wherein the Group IA metal compound is selected from the group consisting of methyl lithium, ethyl lithium, n-propyl lithium and n-butyl lithium.

7. The battery of claim 6 wherein the Group IA metal compound is n-butyl lithium.

8. The battery of claim 3 wherein the Group IA metal compound is a Group IA metal-aryl compound.

9. The battery of claim 8 wherein the aryl compound is selected from the group consisting of naphthalene, anthracene and pyrene.

10. The battery of claim 9 wherein the Group IA metal is selected from lithium, sodium and potassium.

11. The battery of claim 10 in which the Group IA metal is lithium.

12. The battery of claim 10 wherein the Group IA metal-aryl compound is sodium naphthalide.

* * * * *